(12) United States Patent
Rocktäschel

(10) Patent No.: US 10,766,812 B2
(45) Date of Patent: Sep. 8, 2020

(54) COMPOSITION CONTAINING MODIFIED CHROMATE-DEFICIENT RED MUD AND METHOD FOR PRODUCING SAME

(71) Applicant: Fluorchemie GMBH Frankfurt, Bergheim (DE)

(72) Inventor: Christian Rocktäschel, Bergheim (DE)

(73) Assignee: Fluorchemie GmbH Frankfurt, Bergheim (DE)

( * ) Notice: Subject to any disclaimer, the term of this patent is extended or adjusted under 35 U.S.C. 154(b) by 0 days.

(21) Appl. No.: 16/084,118

(22) PCT Filed: Mar. 15, 2016

(86) PCT No.: PCT/EP2016/025025
§ 371 (c)(1),
(2) Date: Sep. 11, 2018

(87) PCT Pub. No.: WO2017/157406
PCT Pub. Date: Sep. 21, 2017

(65) Prior Publication Data
US 2019/0100459 A1 Apr. 4, 2019

(51) Int. Cl.
| | | |
|---|---|---|
| C04B 18/04 | (2006.01) | |
| C04B 40/00 | (2006.01) | |
| C04B 20/10 | (2006.01) | |
| C04B 28/00 | (2006.01) | |
| C04B 18/02 | (2006.01) | |
| C09K 8/03 | (2006.01) | |
| C04B 28/06 | (2006.01) | |
| C04B 28/26 | (2006.01) | |
| C04B 111/10 | (2006.01) | |
| C04B 111/28 | (2006.01) | |
| C04B 111/54 | (2006.01) | |
| C04B 103/00 | (2006.01) | |
| C04B 111/00 | (2006.01) | |
| C04B 111/52 | (2006.01) | |

(52) U.S. Cl.
CPC ........ *C04B 18/0409* (2013.01); *C04B 18/023* (2013.01); *C04B 20/1018* (2013.01); *C04B 20/1055* (2013.01); *C04B 20/1066* (2013.01); *C04B 28/006* (2013.01); *C04B 28/06* (2013.01); *C04B 28/26* (2013.01); *C04B 40/0042* (2013.01); *C09K 8/032* (2013.01); C04B 2103/0094 (2013.01); C04B 2103/0096 (2013.01); C04B 2111/00258 (2013.01); C04B 2111/00758 (2013.01); C04B 2111/00862 (2013.01); C04B 2111/1075 (2013.01); C04B 2111/28 (2013.01); C04B 2111/52 (2013.01); C04B 2111/54 (2013.01); *Y02P 40/165* (2015.11); *Y02W 30/91* (2015.05)

(58) Field of Classification Search
CPC .............. C04B 18/023; C04B 18/0409; C04B 20/1018; C04B 20/1055; C04B 20/1066; C04B 28/006; C04B 28/06; C04B 28/26; C04B 40/0042; C04B 2103/0094; C04B 2103/0096; C04B 2111/28; C04B 2111/52; C04B 2111/54; C04B 2111/00258; C04B 2111/00758; C04B 2111/00862; C04B 2111/1075; C09K 8/032

See application file for complete search history.

(56) References Cited

U.S. PATENT DOCUMENTS

| | | | |
|---|---|---|---|
| 9,487,636 B2 | 11/2016 | Rocktäschel et al. | |
| 9,908,986 B2 * | 3/2018 | Rocktaschel | .......... F16L 59/028 |
| 2013/0263758 A1 | 10/2013 | Skoda et al. | |
| 2015/0353831 A1 * | 12/2015 | Rocktaschel | .......... C01F 7/066 71/62 |

FOREIGN PATENT DOCUMENTS

| | | |
|---|---|---|
| CN | 102070815 A | 5/2011 |
| EP | 0794161 A1 | 9/1997 |
| WO | 2014114283 A2 | 7/2014 |

OTHER PUBLICATIONS

Sglavo et al., "Bauxite 'Red Mud' in the Ceramic Industry, Part 1: Thermal Behaviour," Journal of the European Ceramic Soci, Elsevier Science Publishers, Barking, Essex, GB, vol. 20, No. 3, Mar. 1, 2000, pp. 235-244.

Yalcin et al, "Utilization of Bauxite Waste in Ceramic Glazes," Ceramics Internatio, Elsevier, Amsterdam, NL, vol. 26, No. 5, Jun. 16, 2000, pp. 485-493.

Lopez et al., "Adsorbent Properties of Red Mud and Its Use for Wastewater Treatment," Water Research, Elsevier, Amsterdam, NL, vol. 32, No. 4, Apr. 1, 1998, pp. 1314-1322.

Xiaolan et al., "Effects of Modification and Calcination Conditions on the Adsorption Performance of Red Mud for Low-Concentration Formaldehyde in Air," Environment Protection Engineering, Dec. 31, 2013, vol. 39, pp. 47-57.

(Continued)

*Primary Examiner* — Anthony J Green
(74) *Attorney, Agent, or Firm* — Ziolkowski Patent Solutions Group, SC

(57) ABSTRACT

The invention relates to a composition which contains modified chromate-deficient red mud, comprising a mineral composition of—10 to 50 wt. % of iron compounds,—12 to 35 wt. % of aluminum compounds,—5 to 17 wt. % of silicon compounds,—2 to 10 wt. % of titanium dioxide,—0.5 to 6 wt. % of calcium compounds,—0 to 1 ppm of chromium (VI) compounds, and—optionally additional unavoidable impurities. The composition, in particular the modified chromate-deficient red mud, contains a poorly soluble reducing agent for Cr(VI). In this manner, an inexpensive chemical composition is provided in particular as an iteratively functioning long-term adsorbent for pollutants in liquid, gaseous, and solid milieu. The invention further relates to a method for producing same and to uses thereof.

26 Claims, No Drawings

(56) References Cited

OTHER PUBLICATIONS

Ye et al., "Synthesis and Characterization of Geopolymer from Bayer Red Mud with Thermal Pretreatment," Journal of the American Ceramic Society, vol. 97, No. 5, May 4, 2014, pp. 1652-1660.
Ероши На, Н.А. et al., "Геополимерные строительные материалы на основе промышленных отходов: моногр.", Пенза:ПГУАС, 2014, ISBN 978-5-9282-1221-6.

* cited by examiner

COMPOSITION CONTAINING MODIFIED CHROMATE-DEFICIENT RED MUD AND METHOD FOR PRODUCING SAME

The present invention relates to a composition containing modified chromate-deficient red mud, and methods for producing same, and uses.

From the prior art it is already known that red mud is suitable as an adsorbent because of its large internal surface.

Thus, methods for treating waste water with sulfided red mud sorbents, in particular sanitary waste water, are known from WO 2013/032419 A2. High-quality water for humans and animals and for industrial processes can be obtained by removing pollutants such as heavy metals, organic and inorganic compounds etc. with sulfided red mud as effective adsorbents from waste water from industrial processes, e.g. food technology, mining, transport. Further natural and industrial pollutants in surface water and ground water include insecticides, herbicides and pharmaceutical residues. These can also be removed by the means described here.

Furthermore, a porous, particulate material comprising red mud or bauxite residue for fluid treatment and removal of pollutants is known from WO 2005/061408 A1. The pollutants include heavy metals, anions and gases.

However, the use of the unmodified red mud used as adsorbent in the described prior art is extremely problematic. Thus, for example, because of the bauxite used in the Bayer process the red mud used as raw material contains not inconsiderable amounts of chromium, which can be present as Cr(VI) and Cr(III). This comes from the mineral chromite which occurs as a companion mineral to bauxite. Thus, if red mud is to be used for example as an adsorber for the immobilisation of heavy metals in the field of waterworks/drinking water treatment, the existence of Cr(VI) must be eliminated, since Cr(VI) is water-soluble, toxic and carcinogenic.

Therefore the object of the present invention us to provide a chemical composition and a method for production thereof, which avoids the disadvantages of the prior art and is suitable as an iteratively functioning long-term adsorbent for pollutants in a liquid, gaseous and solid medium.

This object is achieved by the features of the composition according to claim 1 and a method with the features of claim 17. Advantageous embodiments of the invention are set out in the subordinate claims. In this way in particular a cost-effective chemical composition is provided as an iteratively functioning long-term adsorbent for pollutants in a liquid, gaseous and solid medium.

In the following, the expressions "comprising" or "having" in particular also include the expressions "substantially consisting of" as well as "consisting of". Moreover, in the specified methods in particular the specified sequence is also claimed.

According to the present invention a composition is provided which contains modified, chromate-deficient red mud having a mineral composition of 10 to 50% by weight of iron compounds,
12 to 35% by weight of aluminium compounds,
5 to 17% by weight of silicon compounds,
2 to 10% by weight of titanium dioxide,
0.5 to 6% by weight of calcium compounds,
0 to 1 ppm of chromium(VI) compounds
optionally further unavoidable impurities, wherein the composition, in particular the modified chromate-deficient red mud, contains a poorly soluble reducing agent for Cr(VI).

The inventors of the present invention have found in particular that a (re)oxidation of Cr(III) to Cr(VI) in the modified red mud or the composition containing it can be permanently prevented by means of a poorly soluble reducing agent for Cr(VI). Without wishing to be bound to one theory, the inventors of the present invention assume that this is made possible because due to the poor solubility only a small percentage of the reducing agent is present in a reactive form (for example, as ions in dissolved form), whilst the predominant part of the reducing agent is present in a form which is not directly reactive (for example, as a solid material) and thus to a certain extent a deposit of reductant is present which can prevent a (re)oxidation of Cr(III) to Cr(VI) in the modified red mud or the composition according to the invention over a long time period (or permanently). Because of the poor solubility of the reducing agent it may in particular be possible that only precisely the quantity of reducing agent necessary for the prevention of a (re)oxidation of Cr(III) to Cr(VI) is present in a reactive form and, if required, (for example when the reactive form of the reducing agent is consumed by oxidation) the reactive form can be simulated automatically from the non-directly reactive form by means of a balance shift.

Consequently in all applications in which the composition according to the invention is employed, the danger of coming into contact with chromium(VI) or incorporating it is virtually ruled out. This fact cannot be overestimated since, when the composition according to the invention is used in the aforementioned applications, it is possible for the first time to make it possible for a product produced from red mud to be used in commercial processes. Furthermore, all previous experiments to produce a technically usable recyclable material red mud (RM) failed, because when conventional RM is used all pollutants contained in it (can) always enter the biosphere/lithosphere. Furthermore, materials produced from conventional red mud regularly failed due to legislative limits (maximum values TA water/TA air; Drinking Water Ordinance). The Bauxol scandal in Australian agriculture serves as an example. In the past an occupational disease known as "bricklayers itch" involving various chromate necroses has been opposed to the use of red mud as a constituent of building materials.

In particular the composition according to the invention can have a modified, chromate-deficient red mud having with a content of chromium(VI) compositions of less than 0.75 ppm, in particular of less than 0.5 ppm, in particular of less than 0.25 ppm, in particular of less than 0.1 ppm, in particular of less than 0.05 ppm, in particular of less than 0.02 ppm, in particular of less than 0.01 ppm.

An advantageous further embodiment of the invention provides that the poorly soluble reducing agent for Cr(VI) has a solubility in water at pH 7 and 25° C. of less than 1 g/l, in particular less than 0.5 g/l, in particular less than 0.1 g/l. As a result, the effects described above due to the poor solubility of the reducing agent can be exploited in a particularly effective manner.

A further advantageous embodiment of the invention provides that the poorly soluble reducing agent for Cr(VI) comprises a poorly soluble Fe(II) compound. As a result, for example, a particularly cost-effective reducing agent can be provided which, furthermore, does not introduce any additional type of cations (i.e. cations not already present) into the composition. Furthermore, in this way a particularly effective redox system, namely Fe(II)/Fe(III), for Cr(VI) can be provided.

Because of its position in the galvanic series, according to the following equations the redox system Fe(II)/Fe(III) is capable of reducing Cr(VI) substantially completely (quantitatively) to Cr(III), which is then precipitated for example as a mixed Fe—Cr hydroxide|oxide hydrate.

$$Fe^{2+} \rightarrow Fe^{3+} + 1e^- \text{ where } E(o)=0.77 \text{ V}$$

or $$Cr_2O_7^{2-} + 14H^+ + 6e^- \rightarrow 2Cr^{3+} + 7H_2O \text{ where } E(o)=1.232 \text{ V}$$

or $$HCrO_4^- + 7H^+ + 3e^- \rightarrow Cr^{3+} + 4H_2O \text{ where } E(o)=1.350 \text{ V}$$

thus Cr(VI) is at most only present in the region of the limits of detection. Thus, for example, so long as Fe(II) ions are present in excess, Cr(VI) cannot exist. This surprising knowledge enables first of all the use of the composition according to the invention in the field of adsorption/immobilisation of pollutants in water, in air and in solid materials, such as for example in agricultural applications and in the entire construction industry, when there is a need to work specifically towards minimising chromium(VI).

Advantageously an embodiment of the invention provides that the poorly soluble reducing agent for Cr(VI) comprises iron(II) carbonate ($Fe_2CO_3$, siderite), which can be provided in a particularly simple and cost-effective manner and has a particularly advantageous (poor) solubility in water at pH 7 and 25° C.

An advantageous further embodiment of the invention provides that a combination of readily soluble and poorly soluble Fe(II) compounds, wherein readily soluble Fe(II) compounds can be understood in particular to be such compounds with a solubility in water at pH 7 and 25° C. of more than 1 g/l, in particular more than 5 g/l, in particular more than 10 g/l, and poorly soluble Fe(II) compounds can be understood in particular to be such compounds with a solubility in water at pH 7 and 25° C. of less than 1 g/l, in particular less than 0.5 g/l, in particular less than 0.1 g/l.

A further advantageous embodiment of the invention provides that the modified chromate-deficient red mud comprises a modified chromate-deficient, carbonised red mud in which the weight ratio of Fe(II) carbonate to the oxides of iron is at least 1, in particular at least 1.5, in particular at least 2. As a result in particular a modified chromate-free red mud can be used which can be produced particularly cost-effectively and which, moreover, has particularly advantageous characteristics for some uses of the composition.

A further advantageous embodiment of the invention provides that the modified chromate-deficient red mud comprises a modified chromate-deficient, carbonised and rehydrated red mud, in which the weight ratio of Fe(II) carbonate to the oxides of iron is at least 1, in particular at least 1.5, in particular at least 2, and the weight ratio of the sum of iron hydroxide and iron oxide hydrate to the oxides of iron is at least 1, in particular at least 1.5, in particular at least 2. As a result in particular a modified chromate-free red mud can also be used which can be produced particularly cost-effectively and which, moreover, has particularly advantageous characteristics for some uses of the composition, such as for example a flame-retardant action over a wide temperature range.

A further advantageous embodiment of the invention provides that the composition also comprises a pH buffer system which is configured for stabilising a pH range in which the poorly soluble reducing agent for Cr(VI) and the resulting Cr(III) has a low solubility, in particular a solubility in water at 25° C. of less than 1 g/l, in particular less than 0.5 g/l, in particular less than 0.1 g/l. As a result, the effects described above due to the poor solubility of the reducing agent can be exploited in a particularly effective manner, and in addition due to the poor solubility of the resulting Cr(III) compound a (re)oxidation of Cr(III) to Cr(VI) is made more difficult. In particular it can be advantageous if the pH buffer system is configured for stabilising the pH value (or keeping it substantially constant) in the range from pH 5 to 10, in particular in the range from pH 6 to 9.

A further advantageous embodiment of the invention provides that the modified, chromate-deficient red mud has a specific surface area in the range from 2 to 250 m²/g (measured according to BET), in particular from 10 to 200 m²/g (measured according to BET). As a result the modified, chromate-deficient red mud can be suitable for example in a particularly advantageous manner for use as an adsorbent, such as for example during the purification of liquid or gaseous media.

A further advantageous embodiment of the invention provides that the modified, chromate-deficient red mud has a specific weight of 4.5 g/cm³, in particular at least 5 g/cm³, in particular at least 5.3 g/cm³. As a result the modified, chromate-deficient red mud can be suitable for example in a particularly advantageous manner for shielding or attenuation of radioactive and/or electromagnetic radiation or for use as drilling hole weighting.

A further advantageous embodiment of the invention provides that the composition, in particular the modified, chromate-deficient red mud, is present substantially in the form of a granulate. A granulation of the composition according to the invention can also take place with further additions for special applications, such as for example urea and/or aminosulfonic acid, in order in addition to the nitrate reduction also simultaneously to destroy nitrite. By a conversion of the composition according to the invention into any suitable shaped bodies, such as for example granules, products which are readily manageable are available to the end user for many applications such as for example in the field of adsorption, in agriculture or as a fire extinguishing agent, in particular for wildfires, such as forest fires or peat fires.

A further advantageous embodiment of the invention provides that the composition, in particular the modified, chromate-deficient red mud, has at least a partial surface modification, in particular is provided at least partially with a surface coating. As a result the modified, chromate-deficient red mud can be modified for example in a particularly advantageous manner for many applications as an adsorbent.

A further advantageous embodiment of the invention provides that the composition also contains a further reducing agent for Cr(VI) which is selected in particular from the group consisting of Fe, Al and Zn and is preferably present in evenly distributed form. As a result in particular a particularly fast-acting redox system can be provided which can reduce Cr(VI) to Cr(III) or also nitrate to nitrite particularly quickly and effectively.

By the addition of very fine iron powder, zinc powder or aluminium powder of pyrolytic grinding finish quality, according to the following equations:

$$Al \rightarrow Al^+ + 3e^- \text{ where } E(o)=-1.662 \text{ V}$$

$$Fe \rightarrow Fe^{2+} + 2e^- \text{ where } E(o)=-0.447 \text{ V}$$

$$Fe \rightarrow Fe^{3+} + 3e^- \text{ where } E(o)=-0.037 \text{ V}$$

$$Zn \rightarrow Fe^{2+} + 2e^- \text{ where } E(o)=-0.76 \text{ V}$$

in each case a suitable redox system for Cr(VI)) to Cr(III) is produced. The evolution of gas (such as for example $H_2$) which optionally occurs in this case can then be utilised in order to increase the porosity of the composition according to the invention and thus to the enlargement of the inner surface.

A further advantageous embodiment of the invention provides that the composition also contains an agent for removing nitrate and nitrite which is in particular selected from the group consisting of urea and/or amidosulfonic acid. As a result the modified, chromate-deficient red mud can be suitable for example in a particularly advantageous manner for the purification of water or for water treatment.

A further advantageous embodiment of the invention provides that the composition also contains an agent which is configured for removing pollutants, in particular heavy metals, by means of the formation of poorly soluble salts, and in particular comprises a sulfide. As a result the modified, chromate-deficient red mud can be suitable for example in a particularly advantageous manner for the selective adsorption of anions and/or cations (for example of heavy metals, such as for example cadmium, by means of sulfides with immobilisation as CdS).

A further advantageous embodiment of the invention provides that the composition also contains an agent, in particular an organic substance, which forms activated carbon on the surface during thermal treatment. In this case the activated carbon coating can be formed on the primary particles of the composition and serve for the adsorption of pharmaceuticals, herbicides, hormones, etc.

A method according to the invention for producing a composition according to the invention comprises the following steps:
a) provision of (preferably neutralised) red mud, preferably washed or in the neutral pH range,
b) addition of a poorly soluble reducing agent for Cr(VI) to the red mud and mixing of the poorly soluble reducing agent for Cr(VI) with the red mud,
c) reduction of chromium(VI) compounds contained in the red mud by means of the poorly soluble reducing agent for Cr(VI) to chromium(III) compounds in aqueous systems producing a modified, chromate-deficient red mud.

An advantageous further embodiment of the method provides that in step b) a poorly soluble Fe(II) compound, in particular Fe(II) carbonate, is added as reducing agent for Cr(VI), wherein successively in steps chromium (VI) compounds are reduced to chromium (III) compounds, so that additionally Fe(III) hydroxide|oxide hydrate is formed iteratively.

A further method according to the invention for producing a composition according to the invention comprises the following steps:
a) provision of (preferably neutralised) red mud, preferably washed or in the neutral pH range,
b) reduction of the iron(III) compounds contained in the red mud to iron(II) compounds and of the chromium(VI) compounds contained in the red mud to chromium(III) compounds in aqueous systems,
c) addition of a carbonate compound to the solution obtained in step b) and containing iron(II) compounds and formation of iron(II) carbonate, so that for example a reoxidation of chromium(III) to chromium(VI) can be prevented.

In this way for example in a particularly advantageous manner a composition with a modified, chromate-deficient, carbonised red mud can be obtained.

An advantageous further embodiment of the method further provides a rehydration by oxidation of Fe(II) compounds to Fe(III) compounds in aqueous solution. In this way for example in a particularly advantageous manner a composition with a modified, chromate-deficient, carbonised and rehydrated red mud can be obtained.

Another advantageous further embodiment of the method provides for tempering of the modified, chromate-deficient red mud at a temperature in the range from 450° C. to 700° C. Due to the thermal activation the inner surface and/or the density on can be increased and optionally magnetite can also be produced. However, in this case limits should be observed, for example by decomposition of residual ATH to $Al_2O_3$ or by the use of sintering processes (above 700° C.) which can reduce the inner surface.

Another advantageous further embodiment of the method provides for treatment of the modified, chromate-deficient red mud with acid. An acidic activation by treatment of the red mud with acids can advantageously be carried out in order to increase the inner surface by the removal of sodalites, hydroxides and carbonates etc. In this case limits are set by the solubility of individual red mud constituents.

Another advantageous further embodiment of the method provides for thermal treatment of the modified, chromate-deficient red mud at a temperature in the range from 150° C. to 350° C. As a result can the specific weight of the composition can be increased.

Another advantageous further embodiment of the method provides for granulation of the composition, in particular of the modified, chromate-deficient red mud. As a result the composition can for example be brought into a form which is readily manageable for the end user and can be particularly suitable for many applications such as for example in the field of adsorption, in agriculture or as a fire extinguishing agent, in particular for wildfires, such as forest fires or peat fires.

Another advantageous further embodiment of the method provides for surface treatment, in particular surface coating, of the composition, in particular of the modified, chromate-deficient red mud.

As a result the modified, chromate-deficient red mud can be modified for example in a particularly advantageous manner for many applications as an adsorbent.

Another advantageous further embodiment of the method provides for addition of at least one of the following agents:
 a further reducing agent for Cr(VI) which is selected in particular from the group consisting of Fe, Al and Zn,
 an agent for removing nitrate and nitrite which is in particular selected from the group consisting of urea and/or amidosulfonic acid,
 an agent which is configured for removing pollutants, in particular heavy metals, by means of the formation of poorly soluble salts, and in particular comprises a sulfide, and
 an organic substance, which forms activated carbon on the surface during thermal treatment.

Another advantageous further embodiment of the method provides for a drying step, in particular in substantially non-oxidising atmosphere, such as for example under inert gas. As a result, for example, a composition is obtained which stores particularly well, and which for this purpose is additionally preferably packaged in an airtight manner and/or under inert gas or vacuum-packed.

An embodiment of the invention provides for the use of the composition according to the invention as adsorbent, in particular as an iteratively acting long-term adsorbent.

Furthermore, an advantageous further embodiment of the invention provides for the use of the composition according to the invention for purification of liquid and/or gaseous media, in particular for purification of water or for water treatment and/or for purification of air. In this case the composition according to the invention can be used for removal from aqueous systems of at least one of the group consisting of nitrate, nitrite, phosphate, heavy metals, polyaromatic hydrocarbons (PAH), pharmaceutical metabolites and pathogenic germs. Moreover, the composition according to the invention can be used for removal from gaseous systems of at least one substance from the group consisting of fine dust, pollutants and odorous substances.

Furthermore, an advantageous further embodiment of the invention provides for the use of the composition according to the invention in agriculture, in particular for growth promotion and/or as a soil improver or for soil decontamination.

Furthermore, an advantageous further embodiment of the invention provides for the use of the composition according to the invention as a halogen-free flame retardant and/or as a fire extinguishing agent, in particular for wildfires, such as forest fires or peat fires. When the composition according to the invention is used as a flame retardant for wildfires, such as for example in forests, the redox systems contained in the composition according to the invention as well as the adsorption capacity for pollutants such as Cr(VI) or heavy metals counteract the introduction thereof into the biosphere. Therefore after the fire has been successfully extinguished the composition according to the invention can remain at the location of the incident. It even acts as a growth promoter for the secondary vegetation in fields, woodland, moorland and steppes. Additionally, wind erosion of the topsoil immediately after the incident is minimised by the composition according to the invention. Thus for the first time a fire extinguishing agent is provided which can be used on a large surface area, is cost-effective and is not environmentally harmful, but is biologically and environmentally useful.

Furthermore, an advantageous further embodiment of the invention provides for the use of the composition according to the invention in building materials, in particular for at least one of the following:
  for flameproofing
  for heat insulation
  for heat storage
  for sound insulation
  for shielding or attenuation of radioactive and/or electromagnetic radiation.

Furthermore, an advantageous further embodiment of the invention provides for the use of the composition according to the invention as drilling hole weighting. In the past, due to the inherent proportion of critical heavy metals such as mercury, uranium or thorium, the drilling weighting based on barite (barium sulfate, ground) constituted an important counter-argument to their use in drilling technology/fracking. With the composition according to the invention composition and the ensuing variety of possible surface coatings for controlling the rheology, thixotropy and separability, environmental dangers such as for example contamination of the environment (underground water table) are largely ruled out, since the substance according to the invention on the one hand meets the criteria of the Drinking Water Ordinance and lies below the limiting values thereof, and also permanently adsorbs and immobilises all the pollutants released by the current drilling operation in the drilling environment (heavy metals which have been mobilised by the drilling) and thus prevents them from being bioavailable. Thus the hitherto most serious environment-related argument of all opponents of fracking and environmental activists is contradicted. Thus a state of environmental protection is provided which has been unachievable in the past with conventional drilling technology.

Furthermore, an advantageous further embodiment of the invention provides for the use of the composition according to the invention as a geopolymer or for the production of geopolymers, in particular by means of potassium water glass. The depleted adsorbent contaminated by pollutants can be put to further use or to its end use either as a source of raw material (extraction with for example 1M $HNO_3$ or 1M NaOH) during "secondary mining" or in the form of geopolymers during the final storage/mine backfilling. The adsorbed pollutants are then permanently immobilised in the geopolymers.

Further measures which improve the invention are explained more below in the detailed description of the invention with reference to preferred exemplary embodiments. However, these should in no way be interpreted in such a way that the invention as set out in particular in the claims is limited in any way.

The composition according to the invention is characterised by three essential characteristics:

1) The composition according to the invention has a large inner (BET) surface. Because of this fact substances are adsorbed. The substances are bound to the surface substantially by physical forces.
2) The composition according to the invention is heavy and its density can be increased up to a value >5.3 $g/cm^3$ by tempering. The targeted formation of, for example, magnetite is essential for some applications in building technology as sound insulation, radiation protection, drilling technology, heavy concrete and EMP applications.
3) The composition according to the invention contains, on the basis of its chemical composition, (aluminium hydroxide/oxide hydrate and iron hydroxide/oxide hydrate) Al(III) and Fe(III) ions. Because of the low solubility these cations precipitate specific anions as poorly soluble salts. These include aluminium phosphate and iron phosphate. This fact is very important, since thus for example the eutrophication produced by phosphate is avoided (see the ban on phosphates in, for example, detergents as "builder" systems for washing agents).

Due to an excessively high phosphate content, surface waters are over-nourished. Due to substantial growth and subsequent dying off, the oxygen content is reduced and "dead" bodies of water ensue. Conversely, in future legislation will require phosphate to be recovered, since the phosphate stocks worldwide are shrinking ("peak phosphorus in 2013") and phosphorus compounds/phosphates are an essential plant fertiliser which cannot be substituted.

According to the invention the composition can contain iron(II) carbonate which is produced in the carbonisation of the red mud. With the existence of iron(II) carbonate, iron(II) ions are also present in the composition according to the invention. The siderite has a solubility of $6.7 \times 10^{-3}$%. Thus at any time 67 ppm iron(II) carbonate are dissolved per litre of water.

Thus Al(III), Fe(III) and Fe(II) ions are present in the composition according to the invention. The latter both form a redox system

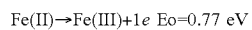
$$Fe(II) \rightarrow Fe(III) + 1e \quad E_0 = 0.77 \text{ eV}$$

The presence of a redox system in the composition according to the invention enables a completely new type of reduction, precipitation and/or adsorption. The redox reactions obey the laws of the galvanic series (Nernst's law). According to this, all substances with a higher electron potential can be reduce, and all substances with a lower electron potential are oxidised. In the case of reduction Fe(II) transitions into Fe(III), and in the case of oxidation Fe(III) transitions into Fe(II).

These facts are fundamental for use in the composition according to the invention, for example in water treatment. Unwashed red mud sometimes contains considerable quantities of chromium, which may be present both as Cr(III) and also as Cr(VI). The latter is highly toxic and carcinogenic. According to the Drinking Water Ordinance of 2012 it may only be present in a limit concentration of <0.05 ppm. Since the redox potential of 1.350 eV is significantly above the redox potential of Fe(II)/Fe(III) (0.770 eV), the Fe(II) reduces the Cr(VI) to Cr(III). Furthermore, the Cr(III) is precipitated at a pH between 7 and 8 as a poorly soluble Cr hydroxide hydrate, or it can form a poorly soluble mixed hydroxide hydrate with the Fe(III) hydroxide hydrate. Consequently the presence of the Fe(II) carbonate phase guarantees that Cr(VI) cannot even exist, and Cr(III) is precipitated. Thus the composition according to the invention becomes a purification/adsorbent which is safe according to the Drinking Water Ordinance and can act by reduction, precipitation and adsorption.

The Fe(II), Fe(III) and Al(III) ions can be reproduced according to the solubility product from the phases siderite, iron hydroxide/oxide hydrate or aluminium hydroxide/oxide hydrate at equilibrium when Fe(II), Fe(III) or Al(III) have been consumed.

Surprisingly, this fact has an extremely important consequence for the adsorption: If Fe(II) reduces other substances, it is oxidised to Fe(III) and in aqueous systems forms Fe(III) hydroxide, which is initially precipitated as a type of slime with a correspondingly high adsorption power. The adsorbent which is thus produced freshly ("in situ") can now adsorb again. The adsorbed substances can be reduced again, wherein further adsorbent is newly formed, which again adsorbs, etc. In other words: An iterative long-term adsorber or an adsorber store is provided, which is effective so long as the Fe(II) source exists and corresponding redox processes take place.

This iterative process described above is a core element of this invention, because it substantially increases the efficiency of the described, composition according to the invention and extends the range of applications, for example in the adsorption, to a high degree.

A further discovery is that the red mud can also be subjected to further chemical modifications. By the addition of iron, aluminium and zinc metal as powder, chips or granules, preferably in finely distributed form, such as for example aluminium of pyrolytic grinding finish quality, a further redox system can be introduced which according to the following equations has a substantially greater redox potential than the described Fe(II)/Fe(III) redox system.

$Al3++3e- \leftrightarrows Al\ Eo=-1.66\ eV$

$Al3+++3e- \leftrightarrows Al\ Eo=-0.04\ eV$

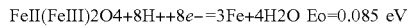
$FeII(FeIII)2O4+8H++8e-=3Fe+4H2O\ Eo=0.085\ eV$

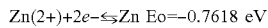
$Zn(2+)+2e- \leftrightarrows Zn\ Eo=-0.7618\ eV$

In addition, the hydrogen produced in the alkaline medium hydrogen in this case serves to further increase the porosity and the inner surface of the composition according to the invention. In the case where the composition according to the invention is further processed to produce shaped bodies/granulate, this process serves inter alia, preferably in conjunction with conventional chemical foaming agents which selectively set the density of the shaped bodies.

Furthermore, entirely unexpectedly, due to thermal activation of the composition according to the invention the specific surface area and in particular the adsorption capacity for the substances to be immobilised can be drastically increased.

Due to the thermal activation, both the goethite, lepidocrocite and boehmite phases in the composition according to the invention and also the siderite phase to be set are partially to completely decomposed almost arbitrarily in percentage terms. In this way an extremely high inner surface (according to BET) is produced on the one hand by elimination of water (from 250 to 300° C. from the different iron hydroxide (oxide hydrate) phases and remaining aluminium hydroxide/oxide hydrate phases) on the other hand above 450° C. carbon dioxide is eliminated from the siderite phase, which further increases the inner surface. The inner surface (according to BET) of the composition according to the invention tempered at a temperature of up to 550° C. can reach a value of >200 m²/g. This explains the enormously increased effectiveness of the composition according to the invention, which has been treated in this way, in its different forms as adsorbent. The porosity increases at the same time as a result.

In waste water treatment/drinking water treatment the nitrate content plays a crucial role worldwide, since in ground water and surface water the limit concentration of <50 mg/litre is exceeded to a large extent (North Rhine-Westphalia 200 to 400 mg/L depending upon the region, California/USA: 800 mg/L in 2015). The causes are, on the one hand, the input of manure or nitrate fertilisers, and on the other hand, processes running in the ground (nitrification; aerobic and anaerobic). According to the literature the lion's share occurs through the input of nitrate as manure or as mineral/chemical fertiliser. The in the bottom proceeding processes back up According to the current scientific status of biochemistry/geochemistry, the processes taking place in the ground only contribute a maximum of approximately 5% to the over-fertilisation due to nitrate.

Fe(II) now reduces nitrate to nitrite, which is then reduced to nitrogen by means of the urea incorporated for example into the granules according to the invention and/or aminosulfonic acid, and escapes as gas. This process can also take place in two phases:

Step 1: Reduction of nitrate to nitrite

Step 2: Destruction of nitrite by reaction with for example urea or amidosulfonic acid and subsequent escape of the nitrogen thus formed.

Thus, in addition to the phosphate problem, a sustainable solution is being sought for the nitrate problem in ground water/surface water which affects water management almost worldwide (see UN Biosphere Report 2014). It is very important here that in the drinking water treatment no chromium(VI) is released, either in the drinking water or in surface waters.

If within the scope of the adsorption the adsorption power of the composition according to the invention (also referred to below as "iRM") decreases, the respective pollutant can be recovered for example either by acidic or basic elution as a recyclable material for industrial utilisation ("secondary mining"). Alternatively, pollutants adsorbed in the iRM can also be converted into geopolymers, i.e. permanently immobilised and thus rendered suitable for ultimate disposal.

The geopolymers produced with the iRM according to the invention are characterised by maximum resistance to acidic/basic media which can occur in the final disposal in wet mines/disposal sites and are resistant to the unwanted mobilisation of the adsorbed pollutants out of the respective geopolymer shaped bodies. So long as the redox system is present and active, no embedded/adsorbed pollutants can be mobilised even by acidic/basic oxidative action.

Because the production of the geopolymers according to the invention guarantees an optimal distribution and dispersion of the consumed/pollutant-laden composition according to the invention in the respective geopolymer, and because furthermore, for example a subsequent surface modification of the consumed composition according to the invention on the basis of hydrophobic polymer systems minimises the penetration of solvents or water, the shaped bodies which can be produced in any geometric shape can be made permanently hydrophobic and thus they can be disposed of safely. This also applies for the final disposal under questionable conditions (for example a wet coalmine with a large amount of sulfur, which is oxidised to $SO_2$ and ultimately produces sulfuric acid which can lower the pH to up to 1).

Additionally the composition according to the invention can be used not only for purification of liquid phases, but also for gas/air purification. An example is the biogas purification to remove $H_2S$ and the purification of the exhaust air from intensive animal farming establishments to remove for example ammonia and $H_2S$. The composition according to the invention can also be used for purification of feed air in buildings. In this case undesirable pollutants are filtered out. The range extends from fine dust/very fine dust to organic contaminants, from PAH through odours to metabolites and pathogens.

In addition, the hydrophilic attraction of the substance to be filtered out can be utilised by the use of a liquid in order to increase the efficiency of a filter cartridge based upon the composition according to the invention. In this case by wetting (moistening) of the bed of the composition according to the invention, for example in a filter cartridge with liquids, the adsorption effectiveness can be still further increased, and also in the event that the liquid is water the optimal humidity of 50 to 60% RH can be set.

In addition, by the action of water the adsorption capacity of the composition according to the invention in this application according to the invention can generally be increased and so the necessary quantity of the composition according to the invention which is to be used can be reduced or the service life of a filter cartridge according to the invention can be prolonged.

The purification of hot gases is greatly facilitated by the combined use of the composition according to the invention (wetted or impregnated) with liquids, since the cooling of the adsorber bed physically advances the adsorption. The removal of pollutants by adsorption which has been described for liquid and gaseous systems can likewise be used in the adsorption of pollutants in fixed systems such as soils in agricultural technology (soil improvers). Pollutants move through the moisture in soils as in liquids. In contact with, for example, granulated composition according to the invention, pollutants are adsorbed/precipitated/immobilised as in gaseous and aqueous systems. This process is long-term. In this respect iterative adsorbers act here in particular as good soil improvers.

This new iRM according to the invention opens up the possibility of cost-effectively designing/generating an adsorbent in/for almost all applications, and also for the first time making available a material which is optimally suitable for additional applications such as drilling weighting aids, fire extinguishing agents for wildfires/open fires as well as waste management and soil improvers. In this case it is crucially important that the composition according to the invention can contain no chromium(VI). The range extends from nitrate removal from drinking water raw material sources, through phosphate enrichment/phosphate recovery for fertiliser purposes, to removal of the most varied pollutants, such as for example heavy metal (ions) from waste water. New technical applications, which could not be provided in this way in the past, have also emerged for filtering of gas/(exhaust) air, in particular in combination with liquids, e.g. water. Also in the agricultural sector there are large spheres of application.

Furthermore, the possibility arises that the composition according to the invention in the form of geopolymer laden with adsorbed pollutants can be converted to a filling material predestined specifically for underground construction/mine backfilling. This opens up broad possibilities for waste management. Thus it is possible for example for the corresponding composition according to the invention in granular form to be tipped into abandoned coal mines which are flooded without water management and have a high pollution load, endangering the existing ground water table in the short to medium term (for example specifically in the Ruhrgebiet), and thus to immobilise the pollutants by permanent adsorption in the composition according to the invention. In this case the pollutant adsorption, immobilisation and final disposal take place simultaneously.

Further fields of application covered by the composition according to the invention are drilling weighting and fire extinguishing agents. In both of these fields the advantage is that, because the end products remain predominantly in the lithosphere or biosphere, not only are there no negative effects such as are noted in the case of the conventionally used materials, but, as set out above, extraordinarily positive effects are produced and no pollutants are introduced into the environment. This should put an end to the contamination of the lithosphere and biosphere, unlike the conventionally/commercially used materials which contain organic bromine compositions and/or antimony trioxide. For the use of the composition according to the invention in practice, the form as shaped bodies, in particular as granules, plays an important role, as this provides the user with a product which can be readily handled.

Granulation Method in the High-Speed/Turbine Mixer

The device used is a turbine/high-speed mixer (Thyssen-Henschel) with a 75 L volume and a speed-controlled (thyristor-controlled) direct current machine.

During the mixing process the respective batch heats up at the maximum speed of rotation (at equilibrium) within 4.5 minutes to 100° C.

For granulation the granulation formulation (s.w.v.) is introduced in a total amount of 20 kg in powder form into the mixer.

The mixer is started at 500 rpm and left to run for 1 minute. Then the respective quantity of acid solution is added in a thin stream at 2500 rpm for 45 seconds. The process is controlled by visual inspection (viewing opening) and the power consumption. If the granules have formed to the required size of 2-3 mm, they are discharged at full speed and are cooled in the flange-mounted cooling mixer (KM) at the slowest speed to room temperature. Then the granules of the required size are separated out on the corresponding sieve set.

Granulation Method with Pelletisinq Plate a) Granules of 2 to 3 mm diameter produced on the 900 mm pelletising plate, as well as microgranules with the mean particle size of 0.25 mm, contain the composition according to the invention and a corresponding proportion of binder/binders (for example CaO, anhydrite, MgO or mixtures thereof) in a percentage which on the one hand enables a maximum content of the composition according to the invention, and on the other hand produces a compressive strength (20N) of the granules which meets the East German "casting range for fertilisers (36 m)".

b) For example, the composition according to the invention is admixed with 10% by weight of a caustic highly purified MgO and is processed in the usual manner on the pelletising plate to produce a granulate with a mean diameter of 2 to 3 mm, such as was used in all the following experiments.

c) The composition according to the invention is equipped with the redox system, for example an iron (II) compound, which produces the redox system $Fe(II)/Fe(III)$ with the goethite from the composition according to the invention.

The resulting shaped bodies/(micro)granules have a compressive strength of up to 50 N.

Individual examples for granulations with different binders and additives: The feed quantity was, unless stated otherwise, 5 kg of the composition according to the invention, measured on an analogous scale. The inclination and the rpm of the granulation plate were generally set so that the vortex optimally "falls" and the maximum particle compaction is produced. Unless stated otherwise, the angle of attack of the granulation plate was 50°.

G 1): 4 kg of the composition according to the invention were provided and at the lowest rotational speed were sprayed with 300 mL sodium water glass solution (density: 1.37) (from pressure pump spray 1000 mL) until a microgranulate resulted. Thereupon a total of 1000 mL water were sprayed on, until a 3 mm granulate was produced.

G 2): A premix, produced in a high-speed mixer, of 5 kg of the composition according to the invention and 8% (400 g) of anhydrite (Radiplus C 17 A) was provided. It was sprayed as quickly as possible with 1370 mL water. After 5 minutes a fine granulate was produced. After 10 minutes larger granules were produced. The speed of rotation of the granulation plate was increased to approximately 15 rpm, and within a further 300 mL water were added. Granules of approximately 3 mm diameter were now produced.

G 3): A premix of 5 kg of the composition according to the invention, 500 g MgO (purissimum) and 8% amidosulfonic acid (purum) was provided and with a turntable inclination of 52° was sprayed slowly (within 20 minutes) with a total of 800 ml potassium water glass solution ("baufan", from OBI). Very solid granules were produced. Then a further 80 mL water were sprayed on. The vortex volume was very dramatically reduced. Subsequently within 35 minutes 100 mL water were added and within 50 minutes 300 mL water were added. Quite uniform granules of 2 to 3 mm particle size were formed.

G 4): A premix, produced in a high-speed mixer, of 5 kg of the composition according to the invention, 15% urea (purissimum) and 5% CaO (purum) was processed for 3 minutes with 1000 ml water being sprayed on to produce 2 mm granules. Then the rotational speed was increased by 2 rpm to optimise the vortex. Within 8 minutes 2000 ml water were sprayed on, and the granule size remained at a maximum of 1.5 mm. By 12 minutes of running, a further 600 ml were added. After good uniform granules of 2.5 to 3 mm were produced, the batch was drained off after 25 minutes.

G 5): 5 kg of the composition according to the invention were sprayed within 3 minutes with 1200 ml potassium water glass (s.w.v.), and granules with a size of 2.5 to 3 mm were quickly formed. Within 10 minutes 200 ml water were sprayed on, and soft granules were formed which were further agitated. As the granules with a size of approximately 3.5 mm solidified, the batch was discharged.

G 6): 5 kg of the composition according to the invention with 1% (50 g) CaO (s.w.v.) from the premix were provided and were sprayed with 1300 ml potassium water glass as quickly as possible within 2 minutes. After 10 minutes granules of 3 mm particle size were produced.

G 7): 4 kg of a premix of the composition according to the invention and 2% (100 g) Fe powder (very fine) were provided and sprayed very quickly with 1400 ml water. After 10 minutes the rest of the premix (1 kg in total) was added. After 1 hour the batch, which had rather laboriously formed granules of approximately 3 mm, was pooled. Total duration: 60 minutes.

G 8): A premix of 5 kg of the composition according to the invention, 500 g MgO (purissimum) and 2% aluminium of pyrolytic grinding finish quality (with lauric acid "pickled" at the factory) was provided and sprayed within 3 minutes with 1500 ml water. Very good small granules were produced. Next the vortex was sprayed with approximately 100 ml 5% citric acid solution (in water). The result was very fine, uniformly distributed 2 to 3 mm granules with a very narrow particle size distribution. Total duration: 25 minutes.

G 9): A premix of 5 kg of the composition according to the invention, 2% (100 g) CaO (s.w.v.) and 2% Zn (purissimum, mean particle size approximately 10 to 20 micrometres) was sprayed within 5 minutes with an 8% solution produced from glacial acetic acid (purissimum) and water. The pre-granules were hot. After 6 minutes 2 scoops of the composition according to the invention and after 8 minutes again 2 scoops of the composition according to the invention are dusted on, in order to prevent the moist very good granules of approximately 2 mm from caking together. At the end quasi-dry granules of 3 mm diameter were produced. Total duration: 10 minutes.

G 10): The granules are tailored to the operating conditions in coalmines and withstand the corrosive conditions up to a pH value of up to two or less. The granules are produced from the composition according to the invention and have a diameter of 30 to 0.1 mm, preferably from 10 to 1 mm and in particular 5 to 2 mm. Both granulation methods can be used or have been used. According to the invention, the granulate absorbs all inorganic and organic pollutants which endanger drinking water and principally comprise PAHs emanating from (seeping) hydraulic oil, and immobilises the pollutants by chemical reaction/adsorption. For easier introduction into the drilled regions the density of the (foam) granules is set in a targeted manner so that it is close to 1 $g/cm^3$. As a result, if the granules are introduced as a slurry the flowability thereof is promoted and depositions of the granules, as the actual active substance which must be introduced as far as possible into the furthest corners of the mine, are reduced or prevented.

Since the adsorption/chemical bond formation under the wet conditions in the mine is irreversibly and the granulate according to the invention, due to the formulation(s), is largely resistant to environmental influences, the granulate is left permanently in the abandoned mine, since the conditions for safe final disposal are guaranteed.

Further Processing

Drying

The granules produced were dried in each case for 1 hour at 110° C. in a vacuum drying oven. The bulk density (UTBD=Untamped Bulk Density) is 1800 g/l. The TBD (Tamped Bulk Density) is 1900 g/l. The eluate analysis shows that all harmful ions are at the limits of detection at <1 ppb. This applies to Ni, Cd, Pb, As, Hg, V, U, Th, Zn, Sn, etc. and the corresponding harmful anions such as nitrate, sulfate, phosphate, etc.). Thus both granulate systems are free of chromium(VI) and are below the limiting values of the Drinking Water Ordinance in the new edition thereof dated 2012, or are at the limits of detection of the respective pollutants. Likewise the systems comply with the Fertilisers Ordinance, which sets lower limiting values than the Drinking Water Ordinance, since safety is required here because of possible concentration of pollutants in the most varied plants (cadmium concentrates in salad buckwheat and strontium and caesium 137 concentrate in mushrooms).

Thermal Activation

The adsorption of the composition according to the invention, or of the starting product, red mud, washed and thermally activated, or acidically activated, are used as reference variables. These values resulted in two base lines ("0 lines"), which clarified the improvement of the composition according to the invention in all relevant aspects by comparison with original, untreated red mud and conventionally activated red mud. For this purpose a comparison was made between the results of the tempering of the composition according to the invention, and also of the tempering of the granules/shaped bodies produced therefrom, in terms of increased BET/porosity and effectiveness of adsorption.

Description of tests of thermal activation of the composition according to the invention/granulate: The composition according to the invention is heated either as a powder or in the form of shaped bodies (for example granules) in a neutral atmosphere/protective gas in a muffle furnace with corresponding protective gas supply. The retention period and the temperature control of the described furnace conform to the desired degree of activation. The granulate according to the invention, as described here, exhibited the best activation with the parameters referred to in G 9) (adsorption tests).

Surface modification for hydrophobisation/sealing of pollutant-laden, granules for final disposal.

The material which is to be surface-modified is introduced in a liquid phase which releases the surface-modifying substance(s), for example in a ratio of 10 to 1, and is stored for a long time. If the surface coating is applied to the surface of the (primary) particles, is decanted, and the solvent is vaporised. It is also possible to coat granules/primary particles with precise surfaces by means of a turbine/fast mixer. The material to be treated is introduced into the mixer together with the coating agent. In the case of reactive coating agents (organosilanes, aluminates, Me-organic compositions such as zircon aluminates/titanates; etc.) is agitated until the ensuing reaction product (for example volatile organic compositions such as alcohol, 2-methoxy ethanol or water) is evaporated. It is likewise possible to apply semi-permeable membranes made of suitable polymers if a delayed release of required adsorbed constituents (for example PKN fertilisers, trace elements, systemic plant protection agents, etc.) is desired. In this case the speed of release is controlled, taking account of the respective plant and soil chemistry, by varying the membrane thickness/solubility of the membrane polymer system. Waterproofing agents, encapsulation agents, surface modification and surface sealing are typically applied in the range from 0.1% to by weight to 10% by weight of reaction agent (s.w.v.), based on the total weight of the granules to be treated, preferably from 0.5 to 5% by weight and in particular 1% by weight.

EXAMPLES OF APPLICATIONS

Nitrate Removal from Aqueous Systems

First of all the freshly introduced granulate bed is equilibrated with a column volume of demineralised water. Next the nitrate solution is pumped through the column at 0.1 L/minute. A sample is taken from the overflowing eluate at the head of the column at intervals of 10 minutes and is examined for nitrate by means of AAS. Even after 200 minutes no nitrate can be found in the eluate.

For nitrate removal from an aqueous solution, shaped bodies according to the invention, which contained 10% by weight of amidosulfonic acid (p.a.), were used in a second test.

The test setup corresponds to the above, with the difference that the nitrate concentration was now 800 mg/l (ground water nitrate value in California, USA) and the quantity of nitrate solution was 1000 l. Here too, no nitrate was found at any time in the samples taken, i.e. conversely, all nitrate had been removed. The check for sulfate ions also did not produce any positive findings.

Purification of Gaseous Substances

Air which has previously been bubbled through manure (pig manure from a fattening farm) by means of a fine nozzle flows through a granulate bed of 100 mm diameter and 1000 mm length in a vertical glass tube. In the olfactory test of the "air" a heavy odour pollution was detected. If this test "air" is drawn at 50 l/minute through the granulate bed of the composition according to the invention, no odour nuisance can be detected any more at the end of the test section (after the column) by the olfactory test.

Ammonia is withdrawn from a cylinder and by means of a pressure reducer and an air bypass valve an air/gas mixture with 200 ppm $NH_3$ was produced in the total gas stream. The flow meter shows a flow rate von 50 l/minute. The exhaust air coming out of the filter tube (dimensions as previously described) is subjected to an olfactory test for a pungent odour of ammonia. The detection limit/perception limit of humans ranges from 0.03 to 0.05 ppm ammonia. The limit value is 20 ppm. In order to increase the adsorption power, the system can be supplied with water.

For the removal of fine dust/very fine dust filter cartridges were used as in the case of air purification (1000 mm long and 100 mm internal diameter). The entire system was operated at 12 000 L/h.

The test system for the air washing with fine/very fine dust pollution of 10 mg/m³ comprises the provision of a test medium, wherein through permanent air turbulence, controlled by air turbidity (extinction) by means of lasers, it is ensured that during the test the dust distributed in the test air remained constant over the entire volume flow. Interestingly it has been determined that the cartridge packing which is kept wet by injection of water (through four laterally arranged nozzles by means of hose pumps in each case) has an approximately twenty times filter action.

Geopolymers

The production of geopolymers from potassium water glass takes place so that the alkali/silicon ratio is varied from 1-4. The geopolymer bound to potassium water glass as described below preferably operates with the K/Si ratio 1 to 2, wherein in this example fly ash or tailings are used as a component supplying Si. The material in the form of its individual components, together with the composition according to the invention loaded by adsorption, is introduced into a high-speed mixer and agitated at maximum rotational speed until the heating of the material mixture by the friction reaches 100° C. 80° C. are sufficient in order to accelerate the polymerisation reaction. Next the geopolymer raw material is discharged and compressed in corresponding moulds for production of the standard testpieces so that as far as possible no cavities ensue. The shrinkage of the shaped bodies is minimised here, so that no cracks occur in the shaped bodies arriving for final disposal and so the integrity of the shaped bodies is maintained. Studies of the eluate of the geopolymer (broken granulate) show that no pollutants from the geopolymer enter the aqueous phase.

The implementation of the invention is not limited to the preferred exemplary embodiment se out above. On the contrary, a plurality of variants is conceivable which makes use of the described solution even for fundamentally different embodiments.

The invention claimed is:

1. A composition comprising modified, chromate-deficient red mud with a mineral composition of:
   10 to 50% by weight of iron compounds;
   12 to 35% by weight of aluminium compounds;
   5 to 17% by weight of silicon compounds;
   2 to 10% by weight of titanium dioxide;
   0.5 to 6% by weight of calcium compounds; and
   0 to 1 ppm of chromium (VI) compounds;
   wherein the modified, chromate-deficient red mud comprises a poorly soluble reducing agent for Cr(VI);
   wherein the composition further comprises a pH buffer system which is configured for stabilising a pH range in which the poorly soluble reducing agent for Cr(VI) and a resulting Cr(III) have a solubility in water at 25° C. of less than 1 g/l; and
   wherein the composition further comprises at least one of:
      an agent for removing nitrate and nitrite which is selected from the group consisting of urea and amidosulfonic acid; and
      an agent which is configured for removing pollutants by means of the formation of poorly soluble salts.

2. The composition according to claim 1, wherein the poorly soluble reducing agent for Cr(VI) comprises a poorly soluble Fe(II) compound.

3. The composition according to claim 1, wherein the poorly soluble reducing agent for Cr(VI) comprises iron(II) carbonate ($FeCO_3$).

4. The composition according to claim 1, wherein a combination of readily soluble and poorly soluble Fe(II) compounds are contained therein.

5. The composition according to claim 1, wherein the modified, chromate-deficient red mud comprises a modified chromate-deficient, carbonised red mud comprising Fe(II) carbonate and oxides of iron, and in which the weight ratio of Fe(II) carbonate to the oxides of iron is at least 1.

6. The composition according to claim 5, wherein the modified chromate-deficient, carbonised red mud further comprises iron hydroxide and iron oxide hydrate, and in which the weight ratio of the sum of iron hydroxide and iron oxide hydrate to the oxides of iron is at least 1.

7. The composition according to claim 1, wherein the composition also contains at least one of the following agents:
   a further reducing agent for Cr(VI);
   an agent for removing nitrate and nitrite;
   an agent which is configured for removing pollutants by means of the formation of poorly soluble salts; and
   an organic substance, which forms activated carbon on a surface of the modified, chromate-deficient red mud during thermal treatment.

8. The composition according to claim 1, wherein the modified, chromate-deficient red mud has a specific surface area in the range from 2 to 250 $m^2/g$ (measured according to BET).

9. The composition according to claim 1, wherein the modified, chromate-deficient red mud has a specific weight of 4.5 $g/cm^3$.

10. The composition according to claim 1, wherein the modified, chromate-deficient red mud is present substantially in the form of a granulate.

11. The composition according to claim 1, wherein the modified, chromate-deficient red mud is provided at least partially with a surface coating.

12. The composition according to claim 1, wherein the composition comprises a further reducing agent for Cr(VI)) which is selected from the group consisting of Fe, Al and Zn.

13. The composition according to claim 1, wherein the composition further comprises an organic substance, which forms activated carbon on a surface of the modified, chromate-deficient red mud during thermal treatment.

14. A method for producing a composition comprising modified, chromate-deficient red mud with a mineral composition of 10 to 50% by weight of iron compounds, 12 to 35% by weight of aluminium compounds, 5 to 17% by weight of silicon compounds, 2 to 10% by weight of titanium dioxide, 0.5 to 6% by weight of calcium compounds, and 0 to 1 ppm of chromium (VI) compounds, wherein the method comprises the following steps:
   a) providing neutralised red mud,
   b) adding a poorly soluble reducing agent for Cr(VI) to the red mud and mixing of the poorly soluble reducing agent for Cr(VI) with the red mud,
   c) reducing chromium(VI) compounds contained in the red mud by means of the poorly soluble reducing agent for Cr(VI) to chromium(III) compounds in aqueous systems producing a modified, chromate-deficient red mud, and
   d) adding a pH buffer system which is configured for stabilising a pH range in which the poorly soluble reducing agent for Cr(VI) and a resulting Cr(III) have a solubility in water at 25° C. of less than 1 g/l; and
   wherein the method further comprises at least one of the following steps:
   rehydrating by oxidation of Fe(II) compounds to Fe(III) compounds in aqueous solution;
   tempering the modified, chromate-deficient red mud at a temperature in the range from 450° C. to 700° C.;
   treating the modified, chromate-deficient red mud with acid;
   thermally treating the modified, chromate-deficient red mud at a temperature in the range from 150° C. to 350° C.;
   granulating the modified, chromate-deficient red mud; and
   applying a surface coating to the modified, chromate-deficient red mud.

15. The method according to claim 14, wherein the method further comprises adding at least one of the following agents:
   a further reducing agent for Cr(VI);
   an agent for removing nitrate;
   an agent which is configured for removing pollutants by means of the formation of poorly soluble salts; and
   an organic substance, which forms activated carbon on the surface during thermal treatment.

16. The method according to claim 14, wherein the method further comprises a drying step carried out in a substantially non-oxidising atmosphere under inert gas.

17. A composition comprising modified, chromate-deficient red mud with a mineral composition of:
   10 to 50% by weight of iron compounds;
   12 to 35% by weight of aluminium compounds;
   5 to 17% by weight of silicon compounds;
   2 to 10% by weight of titanium dioxide;
   0.5 to 6% by weight of calcium compounds; and
   0 to 1 ppm of chromium (VI) compounds;
   wherein the modified, chromate-deficient red mud comprises a poorly soluble reducing agent for Cr(VI);
   wherein the composition further comprises a pH buffer system which is configured for stabilising a pH range in which the poorly soluble reducing agent for Cr(VI) and a resulting Cr(III) have a solubility in water at 25° C. of less than 1 g/l; and
   wherein the composition further comprises an organic substance, which forms activated carbon on a surface of the modified, chromate-deficient red mud during thermal treatment.

18. The composition according to claim 17, wherein the poorly soluble reducing agent for Cr(VI) comprises one of:
   a poorly soluble Fe(II) compound; and
   iron(II) carbonate ($FeCO_3$).

19. The composition according to claim 17, wherein a combination of readily soluble and poorly soluble Fe(II) compounds are contained therein.

20. The composition according to claim 17, wherein the modified, chromate-deficient red mud comprises:
   a modified chromate-deficient, carbonised red mud comprising Fe(II) carbonate and oxides of iron, and in which the weight ratio of Fe(II) carbonate to the oxides of iron is at least 1; and
   iron hydroxide and iron oxide hydrate, and in which the weight ratio of the sum of iron hydroxide and iron oxide hydrate to the oxides of iron is at least 1.

21. The composition according to claim 17, wherein the composition also contains at least one of the following agents:
   a further reducing agent for Cr(VI);
   an agent for removing nitrate and nitrite;
   an agent which is configured for removing pollutants by means of the formation of poorly soluble salts; and
   an organic substance, which forms activated carbon on a surface of the modified, chromate-deficient red mud during thermal treatment.

22. The composition according to claim 17, wherein the modified, chromate-deficient red mud has one of:
   a specific surface area in the range from 2 to 250 $m^2/g$ (measured according to BET); and
   a specific weight of 4.5 $g/cm^3$.

23. The composition according to claim 17, wherein the modified, chromate-deficient red mud is present substantially in the form of a granulate.

24. The composition according to claim 17, wherein the modified, chromate-deficient red mud is provided at least partially with a surface coating.

25. The composition according to claim 17, wherein the composition comprises a further reducing agent for Cr(VI)) which is selected from the group consisting of Fe, Al and Zn.

26. The composition according to claim 17, wherein the composition further comprises at least one of:
   an agent for removing nitrate and nitrite which is selected from the group consisting of urea and amidosulfonic acid; and
   an agent which is configured for removing pollutants by means of the formation of poorly soluble salts.

* * * * *